(12) United States Patent
Inamori

(10) Patent No.: US 7,170,501 B2
(45) Date of Patent: Jan. 30, 2007

(54) COORDINATE INPUTTING APPARATUS

(75) Inventor: Yoshimitsu Inamori, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 385 days.

(21) Appl. No.: 10/246,472

(22) Filed: Sep. 19, 2002

(65) Prior Publication Data
US 2003/0051927 A1    Mar. 20, 2003

(30) Foreign Application Priority Data
Sep. 19, 2001    (JP)    ............................ 2001-285370

(51) Int. Cl.
*G09G 5/00*    (2006.01)
(52) U.S. Cl. ..................................... 345/173; 345/179
(58) Field of Classification Search ................ 345/156, 345/173, 179, 180, 102, 174, 175–177, 158, 345/157; 178/18.01, 18.02, 19.01
See application file for complete search history.

(56) References Cited

U.S. PATENT DOCUMENTS

| | | | | |
|---|---|---|---|---|
| 5,491,706 A | * | 2/1996 | Tagawa et al. | 714/812 |
| 5,854,448 A | * | 12/1998 | Nozaki et al. | 178/18.01 |
| 5,896,120 A | * | 4/1999 | Iguchi et al. | 345/102 |
| 5,905,489 A | * | 5/1999 | Takahama et al. | 345/174 |
| 6,091,030 A | * | 7/2000 | Tagawa et al. | 178/18.01 |
| 6,421,042 B1 | * | 7/2002 | Omura et al. | 345/157 |
| 6,624,835 B2 | * | 9/2003 | Willig | 347/173 |
| 6,731,271 B1 | * | 5/2004 | Tanaka et al. | 345/175 |
| 6,744,426 B1 | * | 6/2004 | Okamoto et al. | 345/179 |
| 6,760,009 B2 | * | 7/2004 | Omura et al. | 345/157 |

FOREIGN PATENT DOCUMENTS

JP    10-284282 A    10/1998
JP    2000-207125 A    7/2000

* cited by examiner

*Primary Examiner*—Ricardo Osorio
(74) *Attorney, Agent, or Firm*—Birch, Stewart, Kolasch & Birch, LLP

(57) ABSTRACT

A coordinate inputting apparatus capable of being used in combination with a device generating noise, comprises an input section for inputting coordinates, a detecting section for detecting the input coordinates, and a control section for controlling the entire coordinate inputting apparatus. The control section sets a detecting time during which the detecting section detects the coordinates and a non-detecting time during which detection is not performed, the detecting time and the non-detecting time being alternately repeated, and the control section controls the coordinate inputting apparatus so that an operation of the device is stopped for at least a time during which the coordinate inputting apparatus is otherwise affected by the noise, the time being part of the detecting time.

13 Claims, 8 Drawing Sheets

COORDINATE INPUTTING APPARATUS

BACKGROUND OF THE INVENTION

1. Field of the Invention

The present invention relates to an apparatus for inputting coordinates, such as a tablet or a touch panel.

2. Description of the Related Art

A coordinate inputting apparatus detects coordinates on a plane indicated by a use's finger, a pen, or the like. The coordinate inputting apparatus is more often used in combination with other (electronic) devices than used alone. In this case, the coordinate inputting apparatus is affected by noise from the other device(s), whereby an error may occur in detecting coordinates. For example, when the detection plane of the coordinate inputting apparatus is superimposed on a screen, such as a liquid crystal display apparatus, the coordinate inputting apparatus is affected by periodic noise generated when the backlight or the frontlight of the liquid crystal display apparatus is driven, resulting in the occurrence of an error in detecting coordinates.

To avoid this, for example, Japanese Laid-Open Publication No. 10-284282 discloses the following technique. The operation of an inverter for allowing the backlight of a liquid crystal display apparatus to emit light is stopped in cycles. A position detection signal created by a touch pen is output during each stop cycle so as to prevent the position detection signal from being influenced by noise from the inverter. Moreover, the average luminance of the backlight, which is reduced by the stopping of the operation of the inverter, is compensated by adjusting the luminance of the backlight.

Japanese Laid-Open Publication No. 2000-207125 discloses another technique. The light of a liquid crystal display apparatus is turned off in synchronization with AD conversion of a detection signal by a tablet, thereby preventing the AD conversion of the detection signal from being influenced by noise from the light. The turned-off state of the light is delayed relative to a control signal for turning off the light. To cancel out such a delay, the timing of generating the control signal is moved ahead.

Although in Japanese Laid-Open Publication No. 10-284282 the position detection signal is output in synchronization with the stop cycle of the inverter operation, deviation of the response operation of the inverter, or the like, is not taken into consideration. Therefore, the influence of noise from the inverter cannot be said to be completely removed. If the stoppages in the stop cycle of the inverter operation are elongated so as to completely remove the influence of noise from the inverter, the average luminance of the backlight is largely reduced, so that the reduction in the average luminance cannot be compensated. Moreover, the control of the inverter is complicated.

In Japanese Laid-Open Publication No. 2000-207125, the light of the liquid crystal display apparatus is turned off in synchronization with the AD conversion of the detection signal from the tablet. Such synchronization control is complicated. Moreover, considering the delay of turning off the light, the timing of the control signal is determined. However, no measure is taken for the delay of the turned-on state of the light. Actually, the delay of the turn-on state of the light is greater than the delay of the turned-off state of the light. The delay of the turned-on state cannot be ignored.

In either of the above-described publications, the reduction in the average luminance of the light is compensated. However, if the reduction rate of the average luminance is great, it cannot be compensated. Nevertheless, a fundamental measure to prevent the reduction in the average luminance of the light, such as reducing the duration of the turned-off state of the light as much as possible, has not been taken.

SUMMARY OF THE INVENTION

According to one aspect of the present invention, a coordinate inputting apparatus capable of being used in combination with a device generating noise, comprises an input section for inputting coordinates, a detecting section for detecting the input coordinates, and a control section for controlling the entire coordinate inputting apparatus. The control section sets a detecting time during which the detecting section detects the coordinates and a non-detecting time during which detection is not performed, the detecting time and the non-detecting time being alternately repeated. The control section controls the coordinate inputting apparatus so that an operation of the device is stopped for at least a time during which the coordinate inputting apparatus is otherwise affected by the noise, the time being part of the detecting time.

In this coordinate inputting apparatus, an operation of a device which generates noise is stopped for at least a time during which the coordinate inputting apparatus is otherwise affected by the noise of the device, which is part of a detecting time during which coordinates are detected. Therefore, the detection of the coordinates is not affected by the noise of the device. A detecting time during which coordinates are detected and a non-detecting time during which detection is not performed are alternately repeated. Since the device is operated within the non-detecting time, the device can be operated for a long time. For example, if the device is an inverter for emitting light, the reduction rate of the average luminance of the device can be minimized.

According to another aspect of the present invention, a coordinate inputting apparatus capable of being used in combination with a device generating noise, comprises an input section for inputting coordinates, a detecting section for detecting the input coordinates, and a control section for controlling the entire coordinate inputting apparatus. The control section controls the coordinate inputting apparatus so that an operation of the device is stopped for at least a time during which the coordinate inputting apparatus is otherwise affected by the noise, the time being part of a detecting time during which the coordinates are detected. The control section further controls the coordinate inputting apparatus so that when the operation of the device is resumed, at least part of a delay time of rising of the device is included within the time during which the coordinate inputting apparatus is otherwise affected by the noise.

In this coordinate inputting apparatus, an operation of a device which generates noise is stopped for at least a time during which the coordinate inputting apparatus is otherwise affected by the noise of the device, which is part of a detecting time during which coordinates are detected. Therefore, the detection of coordinate is not affected by the noise of the device. A delay time of rising of the device generated when an operation of the device is resumed is at least partly included within the time during which the coordinate inputting apparatus is otherwise affected by the noise of the device. Therefore, the delay time of rising of the device is not wasted and the actual time during which the operation of the device is stopped is not unreasonably long. Therefore, for example, if the device is an inverter for emitting light, the reduction rate of the average luminance of the device can be minimized.

In one embodiment of this invention, the length of the delay time of the rising is equal to the length of the time during which the coordinate inputting apparatus is otherwise affected by the noise.

In this coordinate inputting apparatus, even if the operation of the device is resumed immediately after the stop of the operation of the device, the actual operation of the device is stopped until the time during which the coordinate inputting apparatus is otherwise affected by the noise of the device is ended. Therefore, the time during which the operation of the device is stopped, can be minimized.

According to another aspect of the present invention, a coordinate inputting apparatus capable of being used in combination with a device generating noise, comprises an input section for inputting coordinates, a detecting section for detecting the input coordinates, and a control section for controlling the entire coordinate inputting apparatus. The detecting section has a first mode in which the coordinates are detected at a first speed and a second mode in which the coordinates are detected at a second speed greater than the first speed. The control section controls the coordinate inputting apparatus so that the device is stopped for at least a time during which the coordinate inputting apparatus is otherwise affected by the noise, the time being part of a detecting time during which the coordinates are detected. An output of the device in the first mode and an output of the device in the second mode are maintained at a predetermined level.

This coordinate inputting apparatus of the present invention has a first mode in which a detecting section detects coordinates at a first speed and a second mode in which a detecting section detects coordinates at a second speed greater than the first speed, selectively sets either the first mode or the second mode, and maintains the output of the device in the first mode and the output of the device in the second mode at a predetermined level. Therefore, it is possible to achieve a coordinate inputting apparatus which is consistently optimal irrespective of an input speed. Further, the time during which the operation of the device is stopped can be short in the first mode, thereby making it possible to reduce power consumed by the device.

According to another aspect of the present invention, a coordinate inputting apparatus capable of being used in combination with a device generating noise, comprises an input section for inputting coordinates, a detecting section for detecting the input coordinates, and a control section for controlling the entire coordinate inputting apparatus. The control section comprises a signal generating section. The control section controls the coordinate inputting apparatus so that the signal generating section generates a detecting time signal indicating a time during which the signal generating section detects coordinates and an operation stopping signal for stopping an operation of the device for at least a time during which the coordinate inputting apparatus is otherwise affected by the noise, the time being part of a detecting time during which the coordinates are detected, based on a synchronization signal for synchronizing the device and the coordinate inputting apparatus.

According to this coordinate inputting apparatus, a control section comprises a section for generating a signal. The control section controls the coordinate inputting apparatus so that the signal generating section generates a detecting time signal indicating a time during which the signal generating section detects coordinates and an operation stopping signal for stopping an operation of the device for at least a time during which the coordinate inputting apparatus is otherwise affected by the noise of the device, the time being part of a detecting time during which the coordinates are detected, based on a synchronization signal for synchronizing the device and the coordinate inputting apparatus. Therefore, the detecting time signal and the operation stopping signal can be easily and simultaneously created. Further, the timing between the detecting time signal and the operation stopping signal can be set with great precision, so that the time during which the coordinates are detected and the time during which the operation of the device is stopped can be minimized.

Thus, the invention described herein makes possible the advantages of providing a coordinate inputting apparatus, in which an influence of noise from an electronic device, such as an inverter, can be completely removed, while the stoppage in a stop cycle thereof is constrained to a minimum, and a control thereof is not complicated.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
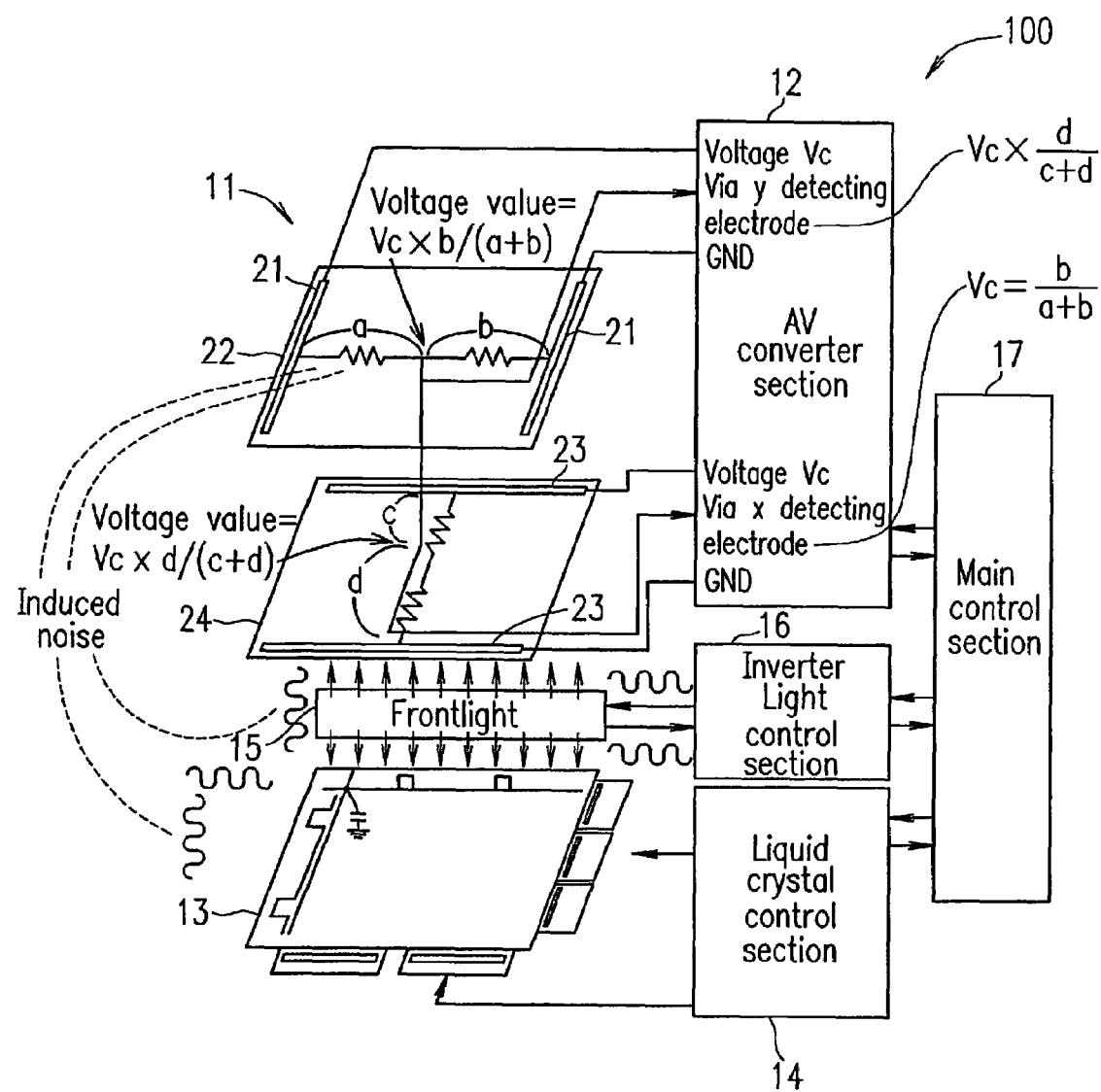
FIG. 1 is a diagram schematically showing a configuration of a coordinate inputting apparatus according to Example 1 of the present invention.

FIG. 1 is a diagram schematically showing a configuration of a coordinate inputting apparatus 100 according to Example 1 of the present invention. The coordinate inputting apparatus 100 comprises a transparent pressure-sensitive tablet 11 and a main control section 17 (control section). The pressure-sensitive tablet 11 comprises an upper tablet 22 for inputting an x coordinate and a lower tablet 24 for inputting a y coordinate (inputting section), and an x detecting electrode 21 for detecting the input x coordinate and a y detecting electrode 23 for detecting the input y coordinate (detecting section). The coordinate inputting apparatus 100 may further comprise a liquid crystal display panel 13 for displaying information, a liquid crystal control section 14 for controlling the liquid crystal display panel 13, a frontlight 15 for illuminating the liquid crystal display panel 13, an inverter light control section 16 for controlling the frontlight 15, and an AD converter section 12 connected to the pressure-sensitive tablet 11. The liquid crystal control section 14 and the inverter light control section 16 may be included in the main control section 17.

The liquid crystal display panel 13 is driven and controlled by the liquid crystal control section 14, displaying a variety of information (e.g., characters, symbols, images, and the like).

The pressure-sensitive tablet 11 is superimposed on a screen of the liquid crystal display panel 13. The user can input coordinates on the screen of the liquid crystal display panel 13 by pressing the pressure-sensitive tablet 11 using a pen, a finger, or the like while watching information displayed on the screen.

The frontlight 15 is driven and controlled by the inverter light control section 16, illuminating the screen of the liquid crystal display panel 13. Therefore, coordinates can be input even in a dark location. Note that in Example 1, the liquid crystal display panel 13 is illuminated by the frontlight 15 from the input side. Alternatively, the liquid crystal display panel 13 may be illuminated by a backlight from the rear side thereof.

The x detecting electrode 21 and the y detecting electrode 23 in the pressure-sensitive tablet 11 detect the coordinates input by a pen, a finger, or the like, and output a voltage signal indicating the coordinates to the AD converter section 12. The AD converter section 12 controls the pressure-sensitive tablet 11 and converts the voltage signal output by the x detecting electrode 21 and the y detecting electrode 23 in the pressure-sensitive tablet 11 to a digital signal.

The main control section 17 controls the entire coordinate inputting apparatus 100. For example, the main control section 17 controls the AD converter section 12 in a manner to obtain the voltage signal indicating the coordinates from the pressure-sensitive tablet 11 and convert the voltage signal into a digital signal. The main control section 17 controls the liquid crystal control section 14 in a manner to cause the liquid crystal display panel 13 to display a variety of information. The main control section 17 also controls the inverter light control section 16 in a manner to turn the frontlight 15 on or off or adjust the average luminance of the frontlight 15.

Next, an operation of the coordinate inputting apparatus 100 of Example 1 will be described in detail below.

The pressure-sensitive tablet 11 comprises the upper tablet 22, in which a pair of the x detecting electrodes 21 facing each other is provided on a transparent resistance thin film, and the lower tablet 24, in which a pair of the y detecting electrodes 23 facing each other is provided on a transparent resistance thin film. The upper tablet 22 is placed on the lower tablet 24, leaving space therebetween. When coordinates are input to the pressure-sensitive tablet 11 by a pen, a finger, or the like, the coordinates are detected separately for the x coordinate and the y coordinate. To detect the x coordinate, a predetermined voltage Vc is applied to one of the two x detecting electrodes 21 of the upper tablet 22 while the other is grounded. In this situation, when a position dividing a space between the two x detecting electrodes 21 at a ratio of a to b is pressed by a pen, a finger, or the like, a voltage signal indicating the x coordinate is generated at the pressing point. This voltage signal is captured via the y detecting electrode 23 by the AD converter section 12. The voltage signal indicating the x coordinate is represented by:

$$\text{Voltage value} = Vc \times b/(a+b) \qquad (1).$$

When detecting the y coordinate, a predetermined voltage Vc is applied to one of the two y detecting electrodes 23 of the lower tablet 24 while the other is grounded. In this situation, when a position dividing a space between the two y detecting electrodes 23 at a ratio of c to d is pressed by a pen, a finger, or the like, a voltage signal indicating the y coordinate is generated at the pressing point. This voltage signal is captured via the x detecting electrode 21 by the AD converter section 12. The voltage signal indicating the y coordinate is represented by:

$$\text{Voltage value} = Vc \times d/(c+d) \qquad (2).$$

When the AD converter section 12 receives the voltage signal indicating the x coordinate and the voltage signal indicating the y coordinate, the AD converter section 12 subjects these voltage signals to AD conversion to obtain respective digital signals which are in turn output to the main control section 17. The main control section 17 calculates the position dividing the space between the two x detecting electrodes 21 at a ratio of a to b, i.e., the x coordinate, and the position dividing the space between the two y detecting electrodes 23 at a ratio of c to d, i.e., the y coordinate, based on the voltage values indicated by the respective digital signals.

However, for example, when the voltage signal of the pressure-sensitive tablet 11 in the coordinate inputting apparatus is superposed on a noise voltage of the inverter light control section 16, the voltage value represented by the voltage signal is deviated from a correct voltage value, resulting in an error in detecting the coordinates. This situation will be described by focusing the detection of the x coordinate performed in the x detecting electrode 21 of the upper tablet 22.

Assuming that the superposed noise voltage from the inverter light control section 16 is represented by b', the voltage value represented by the voltage signal is deviated from the correct voltage value indicated by expression (1), and is represented by:

$$\text{Voltage value} = Vc \times (b+b')/(a+b) \qquad (3).$$

The above-described detection error can be prevented in the following manner. When the voltage signal indicating the coordinates is captured and transferred from the pressure-sensitive tablet 11 to the AD converter section 12, the main control section 17 stops the driving of the frontlight 15 by the inverter light control section 16 so as to prevent the noise of the inverter light control section 16 from affecting the voltage signal of the pressure-sensitive tablet 11. In this regard, however, it is necessary to control the timing of capturing and transferring the voltage signal indicating the coordinates from the pressure-sensitive tablet 11 to the AD converter section 12, and the timing of stopping the driving of the frontlight 15 by the inverter light control section 16. This timing control will be described below with reference to a timing chart shown in FIG. 2.

Figure 2:
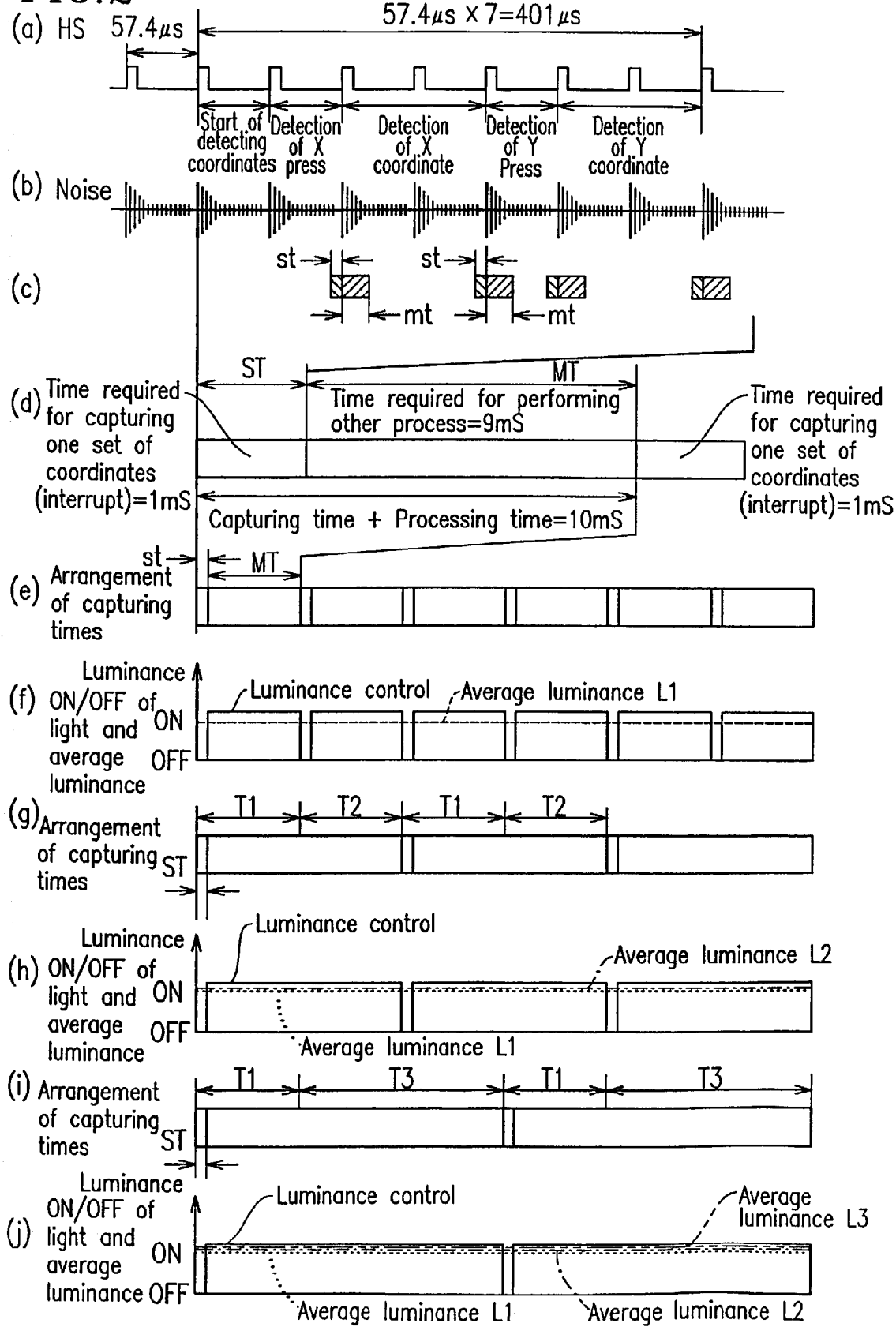
FIG. 2 is a timing chart showing a timing of capturing and transferring a voltage signal indicating coordinates from a pressure-sensitive tablet to an AD converter section, and a timing of stopping driving of a frontlight by an inverter light control section in the coordinate inputting apparatus in FIG. 1.

FIG. 2 is a timing chart showing the timing of capturing and transferring the voltage signal indicating the coordinates from the pressure-sensitive tablet 11 to the AD converter section 12, and the timing of stopping the driving of the frontlight 15 by the inverter light control section 16 in the coordinate inputting apparatus 100 of FIG. 1.

In FIG. 2, (a) shows a horizontal synchronization signal HS used in display control of the liquid crystal display panel 13. In FIG. 2, (b) shows noise associated with the display control. Further, in FIG. 2, (c) shows a detecting time st during which the voltage signal is captured and transferred from the pressure-sensitive tablet 11 to the AD converter section 12, and a processing time mt during which other processes, such as AD conversion of the voltage signal, are performed.

The main control section 17 generates the horizontal synchronization signal HS shown in (a) of FIG. 2, and sets the voltage signal detecting time st and the processing time mt for AD conversion and the like of the voltage signal ((c) in FIG. 2) in synchronization with the cycles of the horizontal synchronization signal HS.

The noise associated with the display control in (b) of FIG. 2 is greatest at the time of rising of the horizontal synchronization signal HS, gradually decreases, and is smallest immediately before the time of rising of the horizontal synchronization signal HS. The display control-associated noise has a large influence on a voltage signal indicating coordinates, but not on other processes of the voltage signal, such as AD conversion. Therefore, the main control section 17 sets the voltage signal detecting time ST to be immediately before the rising of the horizontal synchronization signal HS in order to avoid the influence of the display control-associated noise on the detection of the voltage signal.

In addition, a single x coordinate and a single y coordinate are detected separately. Assuming that the cycle of the horizontal synchronization signal HS is 57.4 μsec, the detection of these coordinates consumes 7×57.4 μsec≅401 μsec. Therefore, the voltage signal detecting time ST is set to be 1 msec as shown in (d) of FIG. 2, including interrupt processes immediately before and after the detection of coordinates. The processing time MT for display control and the like is set to be 9 msec as shown in (d) of FIG. 2. Therefore, it takes 10 msec to perform the detection of the voltage signal and the other processes. In this case, it is possible to take 100 sets of coordinates for one second.

As described above, if the driving of the frontlight 15 by the inverter light control section 16 is stopped when the voltage signal indicating coordinates is captured and transferred from the pressure-sensitive tablet 11 to the AD converter section 12, it is possible to prevent the noise of the inverter light control section 16 from affecting the voltage signal of the pressure-sensitive tablet 11.

Conventionally, for example, as shown in (e) of FIG. 2, the voltage signal detecting time ST and the processing time MT for display control or the like are alternately repeated, and in synchronization with these times, as shown in (f) of FIG. 2, the driving of the frontlight 15 is stopped for the voltage signal detecting time ST and is performed for the processing time MT. However, assuming that the voltage signal detecting time ST is 1 msec and the processing time MT is 9 msec, the average luminance L1 of the frontlight 15 is equal to (the luminance L0 of the turned-on frontlight 15) multiplied by 9/10. Thus, a reduction rate of the average luminance L1 of the frontlight 15 to the luminance L0 of the turned-on frontlight 15 is as great as 10%.

In Example 1, the main control section 17 alternately repeats a coordinate capturing time (detecting time) T1 (10 msec) required for detecting a voltage signal and performing other processes, and a non-capturing time (non-detecting time) T2 having the same time length of 10 msec during which the detection of the voltage signal and the other processes cannot be performed, as shown in (g) of FIG. 2. Thereby, the time of the turned-on state of the frontlight 15 is elongated as shown in (h) of FIG. 2. In this case, the average luminance L2 of the frontlight 15 is equal to (the luminance L0 of the frontlight 15 in the turned-on state) multiplied by 19/20. Thus, the reduction rate of the average luminance L2 to the luminance L0 of the frontlight 15 in the turned-on state is as small as 5% (i.e., the average luminance L2 is increased by 5.6% as compared to the conventional average luminance L1).

Alternatively, as shown in (i) of FIG. 2, a coordinate capturing time T1 having 10 msec and a non-capturing time T3 having 20 msec are alternately repeated. Thereby, the time of the turned-on state of the frontlight 15 is further elongated as shown in (j) of FIG. 2. In this case, the average luminance L3 of the frontlight 15 is equal to (the luminance L0 of the frontlight 15 in the turned-on state) multiplied by 29/30. Thus, the reduction rate of the average luminance L3 to the luminance L0 of the frontlight 15 in the turned-on state is as small as 3.3% (i.e., the average luminance L3 is increased by 7.4% as compared to the conventional average luminance L1).

Note that as described above, since it takes 10 msec to perform the detection of the voltage signal and the other processes, it is possible to take 100 sets of coordinates for one second at maximum. On the other hand, in (g) of FIG. 2, the 10 msec coordinate capturing time T1 and the 10 msec non-capturing time T2 are alternately repeated, so that 50 sets of coordinates are taken for one second. Similarly, in (i) of FIG. 2, the 10 msec coordinate capturing time T1 and the 20 msec non-capturing time T2 are alternately repeated, so that 33 sets of coordinates are taken for one second. Therefore, the number of sets of coordinates taken for one second is reduced. However, for example, only several sets of coordinates are required for one second in order to detect the coordinates of a button displayed on the screen of the liquid crystal display panel 13 by the pressure-sensitive tablet 11. Thus, there is no advantage for detection of such coordinates. In other words, unless the coordinates are moved at a high speed, the taking of 33 or 50 sets of coordinates per second is sufficient for correct detection of the coordinates.

Figure 3:
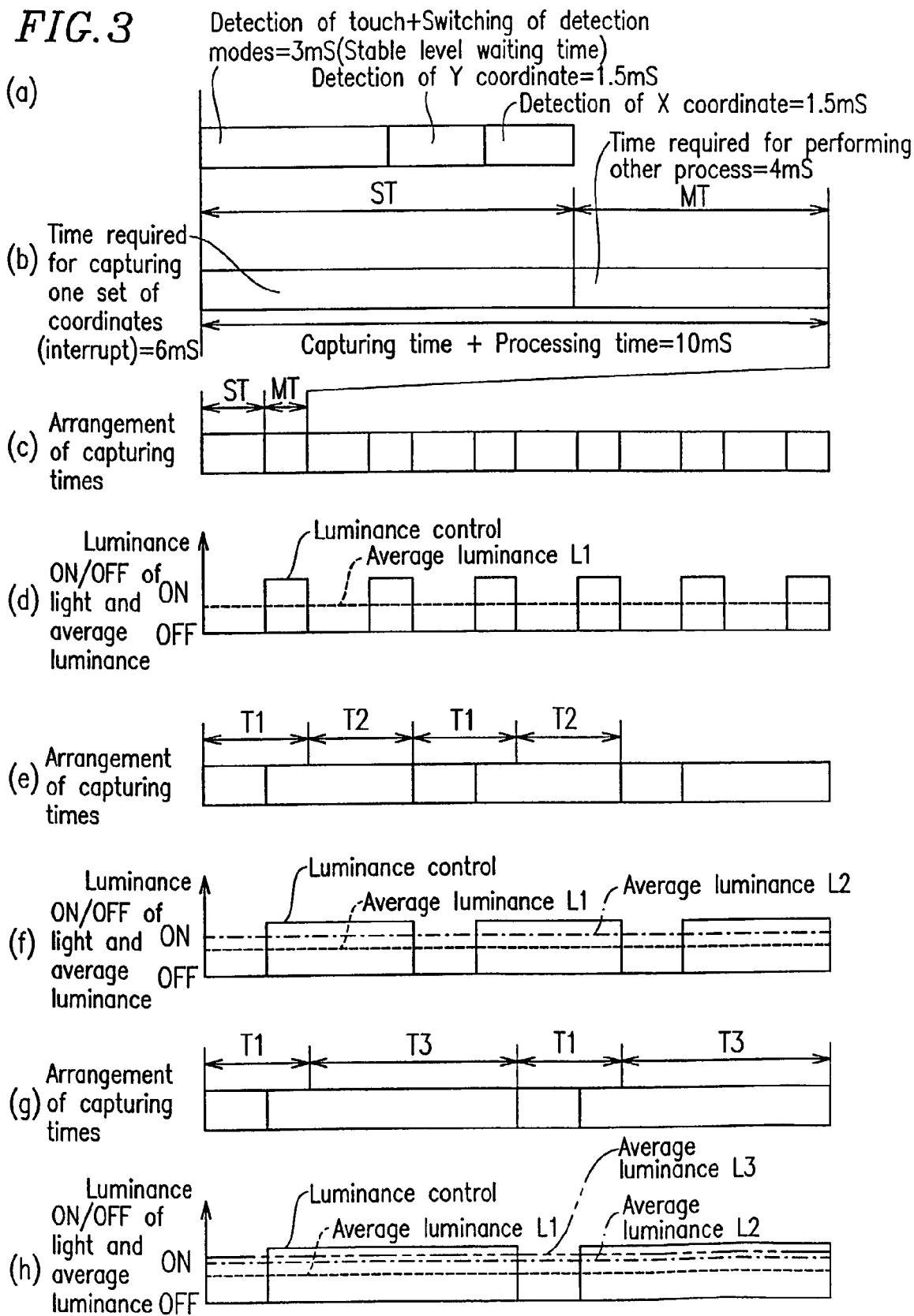
FIG. 3 is a timing chart showing another example of a timing of capturing and transferring a voltage signal indicating coordinates from the pressure-sensitive tablet to the AD converter section and a timing of stopping the driving of the frontlight by the inverter light control section in the coordinate inputting apparatus of FIG. 1.

FIG. 3 is a timing chart showing another example of a timing of capturing and transferring a voltage signal indicating coordinates from the pressure-sensitive tablet 11 to the AD converter section 12 and a timing of stopping the driving of the frontlight 15 by the inverter light control section 16 in the coordinate inputting apparatus of FIG. 1.

In this case, as shown in (a) and (b) of FIG. 3, a detecting time ST for detecting a voltage signal indicating coordinates is set to be 6 msec and a processing time MT for performing AD conversion of the voltage signal, display control and the like is set to be 4 msec. The detecting time ST contains 3 msec for waiting a stable level, 1.5 msec for detecting an x coordinate, and 1.5 msec for detecting a y coordinate.

As compared to FIG. 2, the voltage signal detecting time ST is longer. This is because a high-capacity capacitor is provided for holding the voltage signal output by the pressure-sensitive tablet 11, and it takes a long time for the capacitor to be charged and discharged, for example. Alternatively, this may be because the detecting time ST contains a time for waiting for the voltage signal output by the pressure-sensitive tablet 11 to be stable.

Conventionally, for example, as shown in (c) of FIG. 3, the voltage signal detecting time ST and the processing time MT for performing AD conversion of the voltage signal, display control or the like are alternately repeated, and in synchronization with these times, as shown in (d) of FIG. 3, the driving of the frontlight 15 is stopped for the voltage signal detecting time ST and is performed for the processing time MT. Assuming that the voltage signal detecting time ST is 6 msec and the processing time MT is 4 msec, the average luminance L1 of the frontlight 15 is equal to (the luminance L0 of the frontlight 15 in the turned-on state) multiplied by 4/10. Thus, a reduction rate of the average luminance L1 of the frontlight 15 to the luminance L0 of the turned-on frontlight 15 is as great as 60%.

In Example 1, the main control section 17 alternately repeats a coordinate capturing time T1 (10 msec) required for the detection of the voltage signal and the other processes, and a non-capturing time T2 having the same time length of 10 msec during which the detection of the voltage signal and the other processes cannot be performed, as shown in (e) of FIG. 3. Thereby, the time of the turned-on state of the frontlight 15 is elongated as shown in (f) of FIG. 3. In this case, the average luminance L2 of the frontlight 15 is equal to (the luminance L0 of the frontlight 15 in the turned-on state) multiplied by 4/20. Thus, the reduction rate of the average luminance L2 to the luminance L0 of the frontlight 15 in the turned-on state is as small as 30% (i.e., the average luminance L2 is increased by 75% as compared to the conventional average luminance L1).

Alternatively, as shown in (g) of FIG. 3, a coordinate capturing time T1 having 10 msec and a non-capturing time T3 having 20 msec are alternately repeated. Thereby, the time of the turned-on state of the frontlight 15 is further elongated as shown in (h) of FIG. 3 In this case, the average luminance L3 of the frontlight 15 is equal to (the luminance L0 of the frontlight 15 in the turned-on state) multiplied by 24/30. Thus, the reduction rate of the average luminance L3 to the luminance L0 of the frontlight 15 in the turned-on state is as small as 20% (i.e., the average luminance L3 is increased by 100% as compared to the conventional average luminance L1).

Thus, as the voltage signal detecting time ST is longer, the increase rate of the average luminance of the frontlight 15 is higher as compared to FIG. 2, i.e., an effect of the present invention is more significant.

Figure 4:
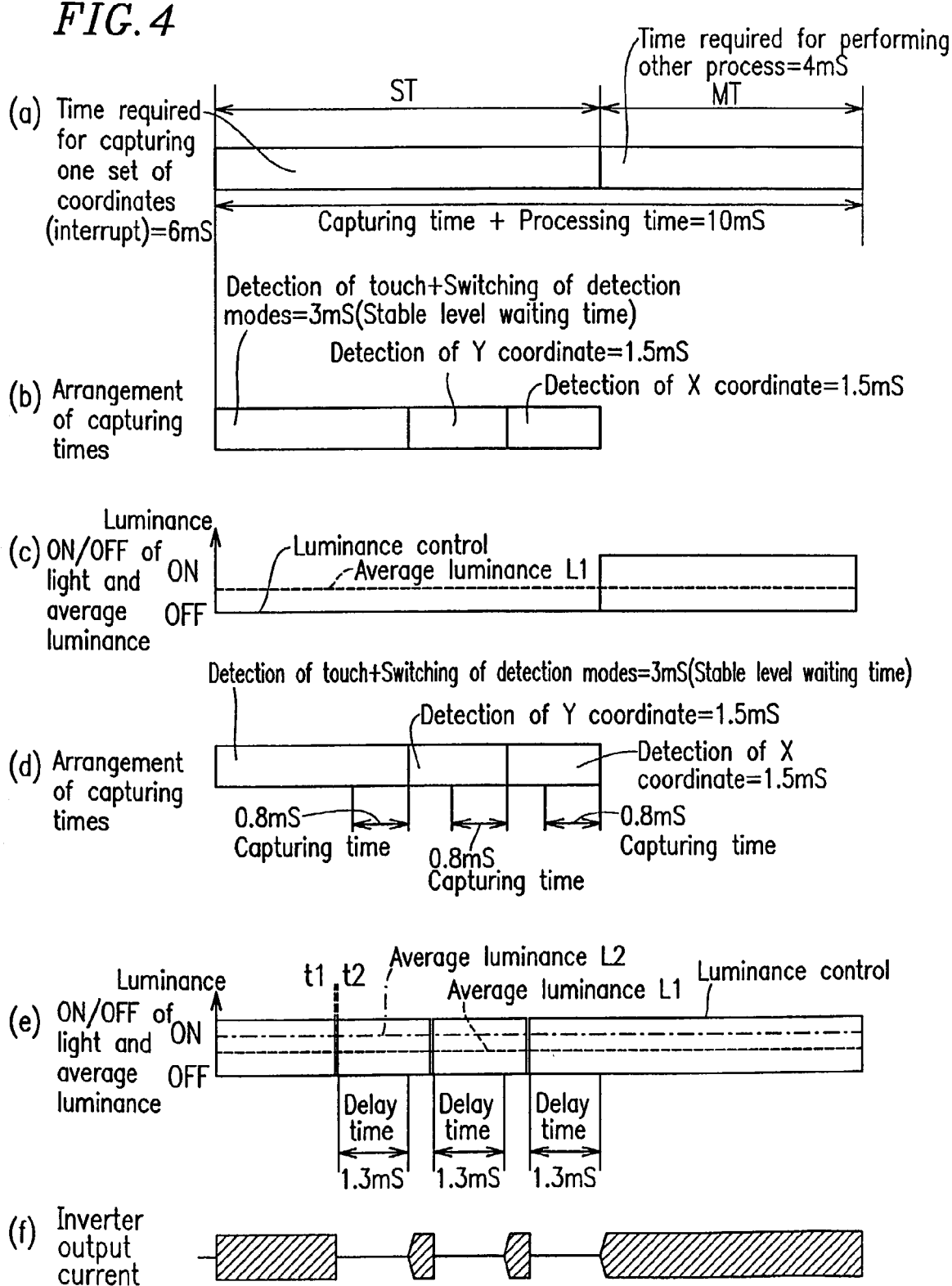
FIG. 4 is a timing chart showing another example of a timing of capturing and transferring a voltage signal indicating coordinates from the pressure-sensitive tablet to the AD converter section and a timing of stopping the driving of the frontlight by the inverter light control section in the coordinate inputting apparatus of FIG. 1.

FIG. 4 is a timing chart showing another example of a timing of capturing and transferring the voltage signal indicating coordinates from the pressure-sensitive tablet 11 to the AD converter section 12 and a timing of stopping the driving of the frontlight 15 by the inverter light control section 16 in the coordinate inputting apparatus of FIG. 1.

In this case, as shown in (a) and (b) of FIG. 4, a detecting time ST for detecting a voltage signal indicating coordinates is set to be 6 msec and a processing time MT for performing AD conversion of the voltage signal, display control or the like is set to be 4 msec. The detecting time ST contains 3 msec for waiting a stable level, 1.5 msec for detecting an x coordinate, and 1.5 msec for detecting a y coordinate.

As shown in (d) of FIG. 4, each of the 3 msec for waiting a stable level, the 1.5 msec for detecting an x coordinate, and the 1.5 msec for detecting a y coordinate contains 0.8 msec required for actually capturing and transferring a voltage signal from the pressure-sensitive tablet 11 to the AD converter section 12. Therefore, the driving of the frontlight 15 by the inverter light control section 16 is stopped only for each 0.8 msec for actually capturing and transferring the voltage signal.

Further, as shown in FIG. 4(e), the control signal of the inverter light control section 16 is turned off at time t1 so that the driving of the frontlight 15 by the inverter light control section 16 is temporarily stopped as shown in FIG. 4(f). In this case, as shown in FIG. 4(e), even if the control signal is turned on at time t2, a time of 1.3 msec must pass before resuming the driving of the frontlight 15 by the inverter light control section 16.

Therefore, as shown in (e) and (f) of FIG. 4, a time from when the control signal of the inverter light control section 16 is continuously switched from off to on to when the driving of the frontlight 15 by the inverter light control section 16 is resumed (a delay time in rising) is set to be 1.3 msec, and at least a part of the time 1.3 msec is contained in the time 0.8 msec during which the voltage signal is captured and transferred from the pressure-sensitive tablet 11 to the AD converter section 12 (time during which an influence of noise is present). Thereby, it is possible to reduce a wasted time in the time during which the driving of the frontlight 15 by the inverter light control section 16 is stopped, and therefore reduce the stoppage time.

In this case, of the detecting time ST for the voltage signal indicating coordinates of 6 msec, only 3.9 msec (=1.3 msec×3) is a time during which the frontlight 15 is turned off, and the remaining 2.1 msec is a time during which the frontlight 15 is turned on. The processing time MT of 4 msec is a time during which the frontlight 15 is turned on. Therefore, the average luminance L2 of the frontlight 15 is equal to (the luminance L0 of the frontlight 15 in the turned-on state) multiplied by 6.1/10. The reduction rate of the average luminance L2 to the luminance L0 is merely 39% (the average luminance L2 is increased by 53% as compared to the conventional average luminance L1).

On the other hand, conventionally, as shown in FIG. 4(c), assuming that the voltage signal detecting time ST is 6 msec and the processing time MT is 4 msec, the average luminance L1 is equal to (the luminance L0 of the frontlight 15 in the turned-on state)×4/10. Thus, the reduction rate of the average luminance L1 to the luminance L0 of the frontlight 15 in the turned-on state is as great as 60%.

Note that when the control of the operation of the inverter light control section 16 is resumed, the inverter light control section 16 has already started supplying a clock signal, and the clock signal gives noise to the voltage signal indicating coordinates. However, the noise level of the clock signal is much lower than the level of noise generated when the operation of the inverter light control section 16 is resumed, i.e., the level of noise induced when the frontlight 15 is turned on. Therefore, the clock signal does not cause an error in detecting the voltage signal. Particularly, when a high-capacity capacitor for holding the voltage signal output from the pressure-sensitive tablet 11 is provided, the noise from the clock signal is removed by the capacitor, causing no problem.

Figure 5:
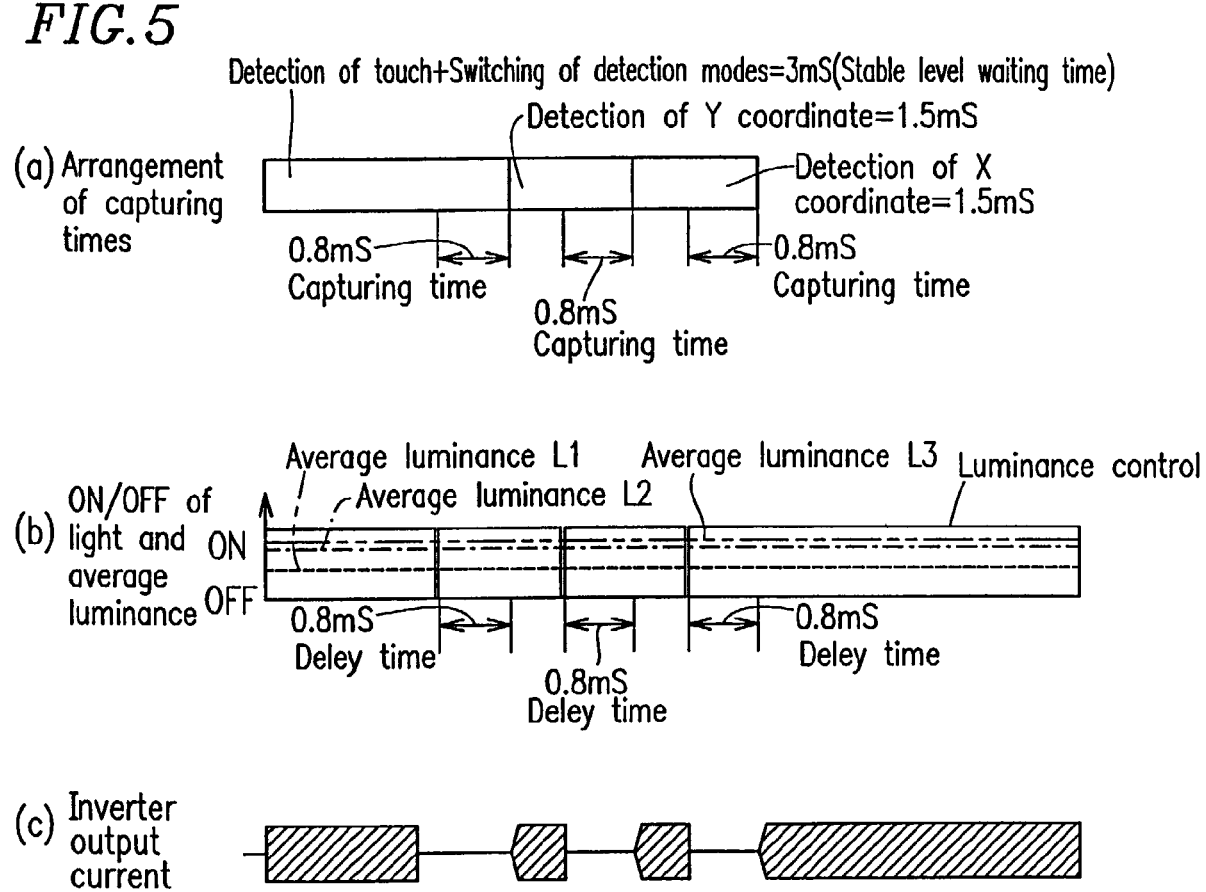
FIG. 5 is a timing chart showing another example of a timing of capturing and transferring a voltage signal indicating coordinates from the pressure-sensitive tablet to the AD converter section and a timing of stopping the driving of the frontlight by the inverter light control section in the coordinate inputting apparatus of FIG. 1.

FIG. 5 is a timing chart showing another example of a timing of capturing and transferring the voltage signal indicating coordinates from the pressure-sensitive tablet 11 to the AD converter section 12 and a timing of stopping the driving of the frontlight 15 by the inverter light control section 16 in the coordinate inputting apparatus of FIG. 1.

As shown in (b) and (c) of FIG. 5, a time from immediately after turning on the control signal of the inverter light control section 16 until the driving by the inverter light control section 16 is resumed is set to be 0.8 msec. Specifically, the time 0.8 msec until the driving is resumed ((b) in FIG. 5) is equal to a time of 0.8 msec required for actually capturing and transferring the voltage signal from the pressure-sensitive tablet 11 to the AD converter section 12 as shown in (a) of FIG. 5. Further, as shown in (a) to (c) of FIG. 5, the time 0.8 msec until the driving is resumed (a delay time in rising) is caused to be equal to the time 0.8 msec required for actually capturing the voltage signal (a time during which an influence of the noise is present) so that the time of the stopping the driving by the inverter light control section 16 is minimized.

In this case, of the detecting time ST for the voltage signal indicating coordinates of 6 msec, only 2.4 msec (=0.8 msec×3) is a time during which the frontlight 15 is turned off, and the remaining 3.6 msec is a time during which the frontlight 15 is turned on. The processing time MT of 4 msec is a time during which the frontlight 15 is turned on. Therefore, the average luminance L2 of the frontlight 15 is equal to (the luminance L0 of the frontlight 15 in the turned-on state) multiplied by 7.6/10. The reduction rate of the average luminance L2 to the luminance L0 is merely 24% (the average luminance L2 is increased by 90% as compared to the conventional average luminance L1).

Next, a coordinate inputting apparatus according to Example 2 of the present invention will be described below. The coordinate inputting apparatus of Example 2 has a structure similar to that of Example 1 shown in FIG. 1, and selectively sets a low-speed detection mode (first mode), in which the number of detections of coordinates per predetermined time by the pressure-sensitive tablet 11 is smaller or a high-speed detection mode (second mode), in which the number of detections of coordinates per predetermined time is greater. The high-speed detection mode is applied to when coordinates to be detected by the pressure-sensitive tablet 11 are moved at a high speed on the screen of the liquid crystal display panel 13, for example, a character is written by a pen, a finger, or the like. The low-speed detection mode is applied to when coordinates to be detected are moved at a low speed or remain stationary on the screen, for example, when a button is indicated on the screen.

Processes in the high-speed detection mode and the low-speed detection mode will be described below with reference to a flowchart shown in FIG. 6.

Figure 6:
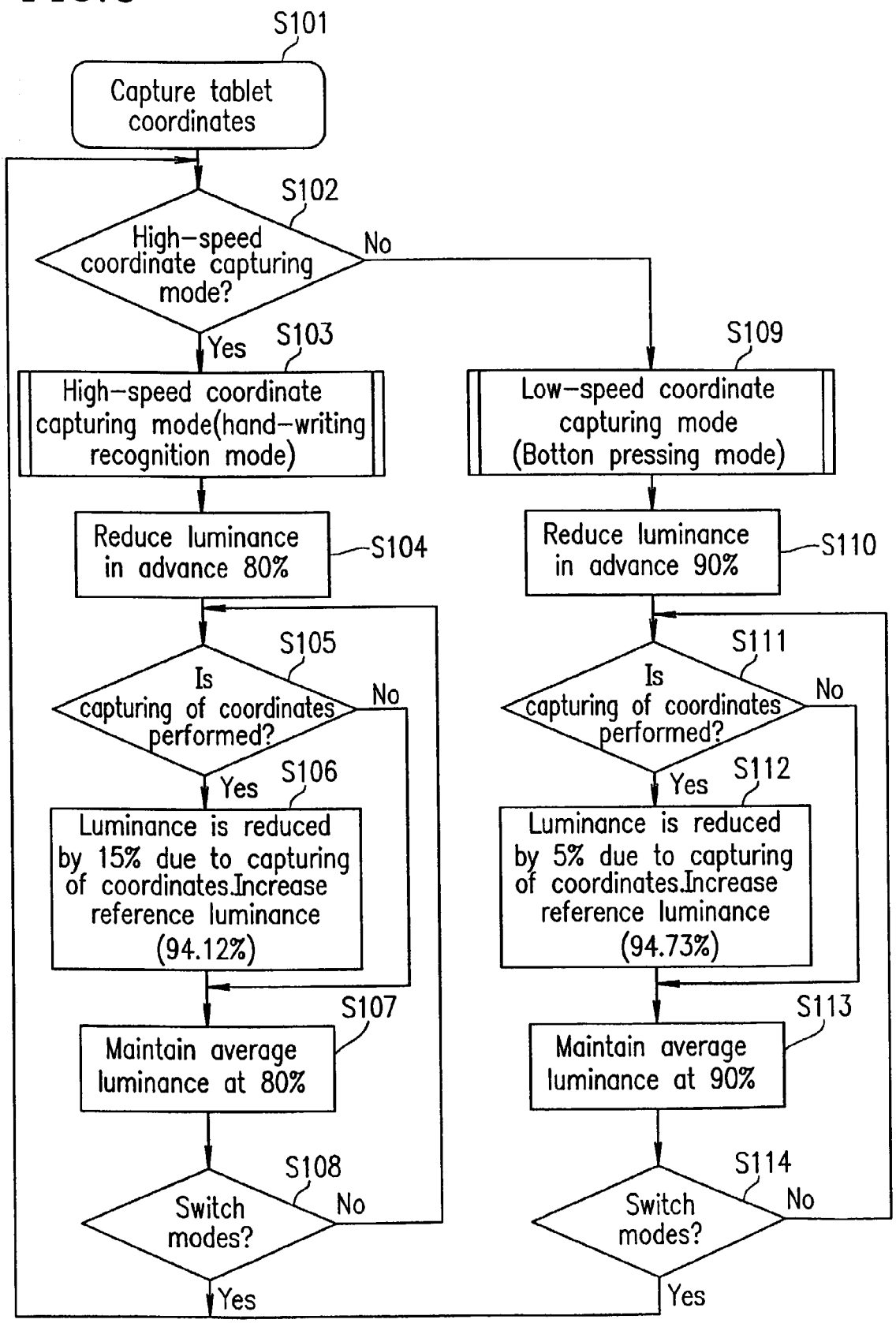
FIG. 6 is a flowchart showing a process in a coordinate inputting apparatus according to Example 2 of the present invention.

FIG. 6 is a flowchart showing a process in the coordinate inputting apparatus of Example 2 of the present invention.

Initially, the main control section 17 starts capturing coordinates using the pressure-sensitive tablet 11 (step S101), and selects either of the high-speed detection mode or the low-speed detection mode (step S102). For example, if a hand-writing input area is displayed on the screen of the liquid crystal display panel 13, the high-speed detection mode is selected, or if a button is displayed on the screen, the low-speed detection mode is selected.

Upon "Yes" in step S102, i.e., when the high-speed detection mode is selected (step S103), the main control section 17 uses the inverter light control section 16 to set a luminance α of the frontlight 15 in the turned-on state to be 80% of the maximum luminance (step S104). The main control section 17 waits for an interrupt from the AD converter section 12 (capturing of coordinates) (step S105). If receiving an interrupt ("Yes" in step S105), the main control section 17 continuously repeats a coordinate capturing time T1 required for detection of the voltage signal and other processes. In this case, every time the main control section 17 captures and transfers a voltage signal indicating coordinates from the pressure-sensitive tablet 11 to the AD converter section 12, the main control section 17 stops the driving of the frontlight 15 by the inverter light control section 16 so as to prevent the occurrence of noise. At the same time, the main control section 17 increases the luminance of the frontlight 15 in the turned-on state so as to prevent a reduction in the average luminance of the frontlight 15 due to the cyclic stop of the driving. For example, if the cyclic stop of the driving of the frontlight 15 causes the average luminance of the frontlight 15 to be reduced by 15%, the luminance of the frontlight 15 is increased from 80% (α) of the maximum luminance to 94.12% (γ) of the maximum luminance so as to compensate 14.2% of the luminance (step S106), thereby maintaining the average luminance of the frontlight 15 at the predetermined value (step S107). The relationship between the original luminance α and the luminance γ is represented by:

$$\alpha = \gamma \times (100-15) \tag{4}$$

Thereafter, the main control section 17 judges whether or not the high-speed detection mode is switched to the low-speed detection mode (step S108). If no mode switch occurs ("No" in step S108), the main control section 17 waits for an interrupt from the AD converter section 12 again while the high-speed detection mode remains selected (step S105). If the switching of the detection modes is performed ("Yes" in step S108), the process returns to step S102.

Note that if the luminance α of the frontlight 15 in the turned-on state is set to be 90% of the maximum luminance, the luminance of the frontlight 15 must be set to 105.19% (γ) of the maximum luminance so as to compensate the cyclic stops of the driving to maintain the average luminance at the predetermined value. Thus, since the luminance γ exceeds the maximum luminance, the average luminance cannot be maintained at the predetermined value.

Next, upon "No" in step S102, i.e., when the low-speed detection mode is selected (step S109), the main control section 17 uses the inverter light control section 16 to set the luminance α of the frontlight 15 in the turned-on state to be 90% of the maximum luminance (step S110). Thereafter, the main control section 17 waits for an interrupt from the AD converter section 12 (capturing of coordinates) (step S111). If an interrupt occurs ("Yes" in step S111), the main control section 17 alternately repeats a coordinate capturing time T1 required for the detection of the voltage signal and other processes and a non-capturing time T2 having the same length as that of T1 during which the detection of the voltage signal and the other processes are not performed. In this situation, every time a voltage signal indicating coordinates is captured and transferred from the pressure-sensitive tablet 11 to the AD converter section 12, the main control section 17 stops the driving of the frontlight 15 by the inverter light control section 16 so as to prevent the occurrence of noise. In this case, since the coordinate capturing time T1 and the non-capturing time T2 are alternately repeated, the time of the turned-on state of the frontlight 15 is longer than when only the coordinate capturing time T1 is continuously repeated, i.e., the high-speed detection mode. At the same time, the main control section 17 increases the luminance of the frontlight 15 in the turned-on state so as to prevent a reduction in the average luminance of the frontlight 15 due to the cyclic stop of the driving. For example, if the cyclic stop of the driving of the frontlight 15 causes the average luminance of the frontlight 15 to be reduced by 5%, the luminance of the frontlight 15 is increased from 90% (α) of the maximum luminance to 94.73% (γ) of the maximum luminance so as to compensate 4.73% of the luminance (step S112), thereby maintaining the average luminance of the frontlight 15 at the predetermined value (step S113). The relationship between the original luminance α and the luminance γ is represented by:

$$\alpha=\gamma \times (100-5) \qquad (5).$$

Thereafter, the main control section 17 judges whether or not the low-speed detection mode is switched to the high-speed detection mode (step S114). If no switch occurs ("No" in step S114), the main control section 17 waits for an interrupt from the AD converter section 12 again while the low-speed detection mode remains (step S111). If the switching of the detection modes is performed ("Yes" in step S114), the process returns to step S102.

Thus, the main control section 17 increases the luminance of the frontlight 15 in the turned-on state so as to prevent the average luminance of the frontlight 15 from being reduced due to the cyclic stop of the frontlight 15 either in the high-speed detection mode or the low-speed detection mode (i.e., in order to maintain a predetermined output level), thereby making it possible to maintain the brightness of the screen of the liquid crystal display panel 13 at a predetermined level.

Note that the average luminance of the frontlight 15 may be equal between in the high-speed detection mode and in the low-speed detection mode. In this case, for example, the luminance α of the frontlight 15 in the turned-on state is set to be 85% of the maximum luminance. If the average luminance of the frontlight 15 is decreased by 15% in the high-speed detection mode, the luminance of the frontlight 15 is increased from 85% (α) of the maximum luminance to 100% (γ) of the maximum luminance (α=γ×(100−15)). If the average luminance of the frontlight 15 is decreased by 5% in the low-speed detection mode, the luminance of the frontlight 15 is increased from 85% (α) of the maximum luminance to 89.47% (γ) of the maximum luminance (α=γ× (100−5)). Therefore, luminance is compensated by 15% in the high-speed detection mode and by 4.47% in the low-speed detection mode, thereby maintaining the average luminance at the predetermined value. Further, in the low-speed detection mode, since the magnitude of the luminance compensation is low, the amount of current consumed by the frontlight 15 can be reduced.

Next, a coordinate inputting apparatus according to Example 3 of the present invention will be described with reference to FIGS. 7 to 10.

Figure 7:
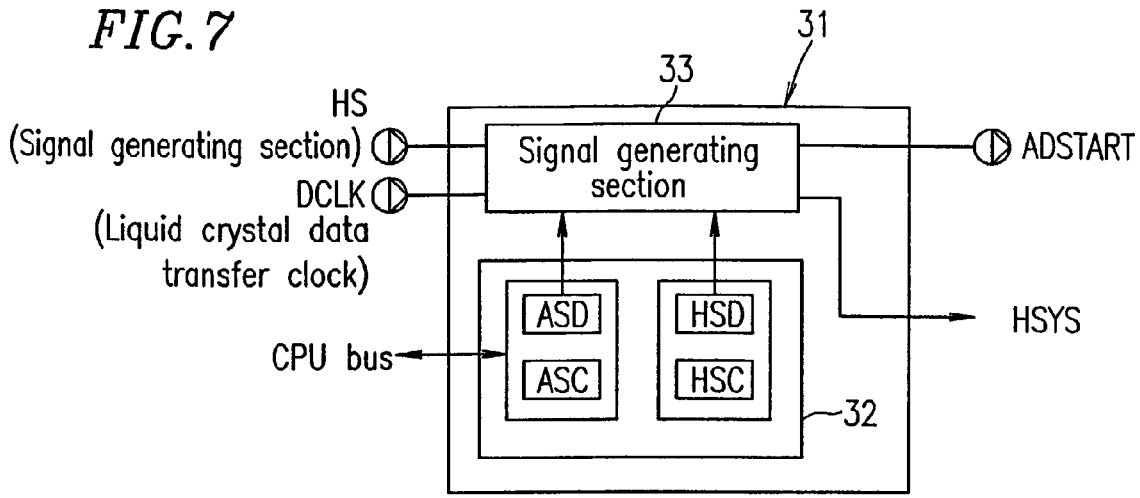
FIG. 7 is a diagram schematically showing a configuration of a timing generating circuit in a coordinate inputting apparatus according to Example 3 of the present invention.

FIG. 7 is a diagram schematically showing a configuration of a timing generating circuit 31 in the coordinate inputting apparatus of Example 3 of the present invention. The coordinate inputting apparatus of Example 3 has a similar configuration to that of Example 1 shown in FIG. 1, but in Example 3 the main control section 17 further comprises the timing generating circuit (signal generating section) 31 of FIG. 7, and the inverter light control section 16 further comprises a PWM light adjusting circuit (light adjusting section) shown in FIG. 9.

In Example 3, when a voltage signal indicating coordinates is captured and transferred from the pressure-sensitive tablet 11 to the AD converter section 12, the driving of the frontlight 15 by the inverter light control section 16 is stopped. Thereby, the noise of the inverter light control section 16 is prevented from affecting the voltage signal of the pressure-sensitive tablet 11.

As shown in FIG. 7, the timing generating circuit 31 comprises a register 32 and a signal generating section 33. The timing generating circuit 31 outputs an ADSTART signal (detecting time signal) indicating a timing of capturing and transferring a voltage signal indicating coordinates from the pressure-sensitive tablet 11 to the AD converter section 12, and a HSYS signal (operation stopping signal) indicating a timing of stopping the driving of the frontlight 15 by the inverter light control section 16.

In this timing generating circuit 31, the register 32 stores a delay time value ASD of the start of capturing of coordinates, which is designated by an integrated CPU (not shown) to the main control section 17, and a pulse width value ASC for capturing coordinates, a delay time value HSD of the start of stopping of the inverter, and a pulse width value HSC for stopping the inverter.

Figure 8:
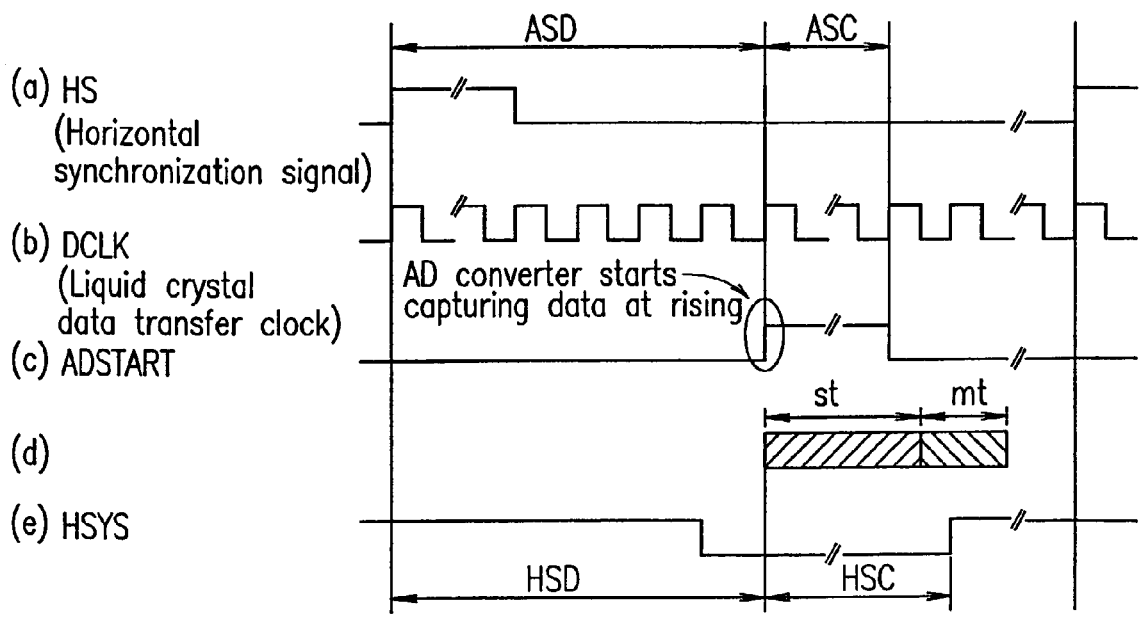
FIG. 8 is a timing chart showing an operation of the timing generating circuit of FIG. 7.

FIG. 8 is a timing chart showing an operation of the timing generating circuit 31 of FIG. 7.

The signal generating section 33 receives a horizontal synchronization signal HS used for display control of the liquid crystal display panel 13 ((a) in FIG. 8) and a data transfer clock signal DCLK ((b) in FIG. 8); starts counting the data transfer clock signal DCLK from the time of rising of the horizontal synchronization signal HS; when the count value reaches the delay time value ASD of the start of fetching of coordinates stored in the register 32, causes the ADSTART signal to rise in (c) of FIG. 8; and when the count value is integrated over the pulse width value ASC for fetching coordinates stored in the register 32, causes the ADSTART signal to fall. At the time of the rising of the ADSTART signal, a voltage signal indicating coordinates is captured and transferred from the pressure-sensitive tablet 11 to the AD converter section 12.

When the count value of the data transfer clock signal DCLK reaches the delay time value HSD of the start of stopping of the inverter stored in the register 32, the signal generating section 33 causes the HSYS signal to fall in (e) of FIG. 8. When the count value is integrated over the pulse width value HSC for stopping the inverter stored in the register 32, the signal generating section 33 causes the HSYS signal to rise. For a time during which the HSYS signal is low, the driving of the frontlight 15 by the inverter light control section 16 is stopped.

(d) of FIG. 8 shows a detecting time st during which the voltage signal indicating coordinates is captured and transferred from the pressure-sensitive tablet 11 to the AD converter section 12, and a processing time mt during which AD conversion of the voltage signal, and the like are performed. The detecting time st and the processing time mt follow the rising of the ADSTART signal in (c) of FIG. 8. The voltage signal indicating coordinates is largely affected by the noise of the inverter light control section 16. To avoid this, the voltage signal detecting time st is overlapped with the time during which the HSYS signal is low (the time during which the driving of the frontlight 15 by the inverter light control section 16 is stopped) so that the voltage signal is not affected by the noise of the inverter light control section 16. On the other hand, the other processes for the voltage signal indicating coordinates, such as AD conversion, are not affected by the noise of the inverter light control section 16. Therefore, the processing time mt is excluded from the time during which the HSYS signal is low (the time during which the driving of the frontlight 15 by the inverter light control section 16 is stopped). By excluding the processing time mt from the time during which the HSYS signal is low, the time during which the driving of the frontlight 15 by the inverter light control section 16 is stopped is reduced, thereby reducing the time of the turned-off state of the frontlight 15 and suppressing a reduction in the average luminance of the frontlight 15.

In addition, noise also occurs upon the display control of the liquid crystal display panel 13. Such a noise has an influence on the voltage signal from the pressure-sensitive tablet 11. The noise associated with the display control is small as compared to the noise of the inverter light control section 16, but it is desired to avoid the influence of the display control associated noise. The noise associated with the display control is greatest at the time of rising of the horizontal synchronization signal HS, decreases gradually, and is smallest immediately before the time of rising of the horizontal synchronization signal HS. Therefore, the time during which the ADSTART signal is high is set immediately before the time of rising of the horizontal synchronization signal HS, so that a voltage signal indicating coordinates is captured and transferred from the pressure-sensitive tablet 11 to the AD converter section 12 for that time. Thereby, an influence of the noise associated with the display control is avoided.

In such a timing generating circuit 31, the ADSTART signal indicating the timing of capturing a voltage signal indicating coordinates and the HSYS signal indicating the timing of stopping the driving of the frontlight 15 by the inverter light control section 16 are simultaneously formed based on the horizontal synchronization signal HS and the data transfer clock signal DCLK. Thereby, the timings of the ADSTART signal and the HSYS signal can be set with great precision. Therefore, the detecting time st during which a voltage signal indicating coordinates is captured and the processing time mt can be minimized.

Figure 9:
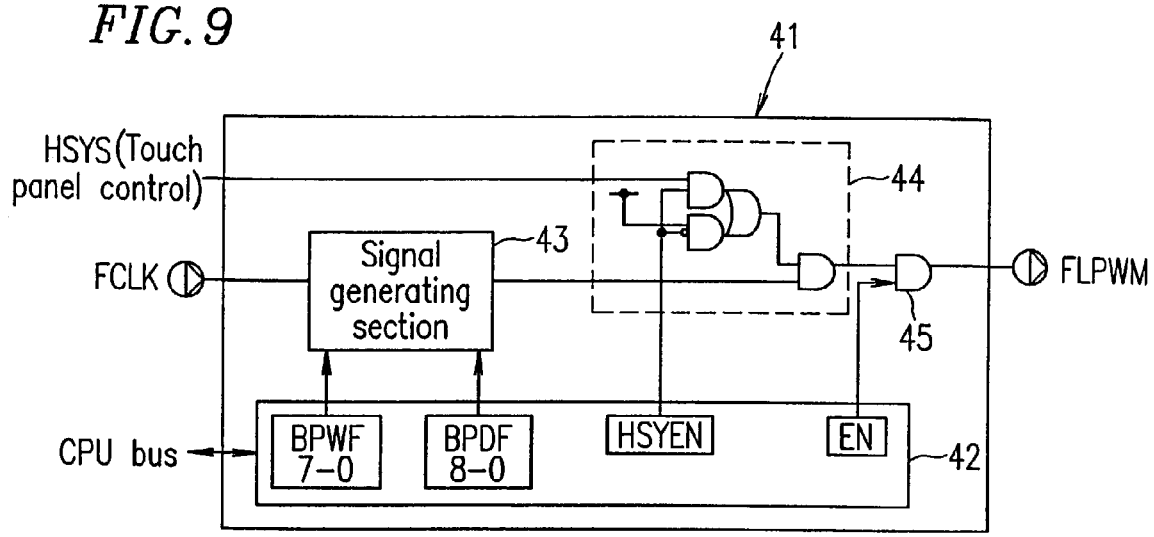
FIG. 9 is a diagram schematically showing a configuration of a PWM light adjusting circuit in the coordinate inputting apparatus of Example 3 of the present invention.

FIG. 9 is a diagram schematically showing a configuration of a PWM light adjusting circuit 41 in the coordinate inputting apparatus of Example 3 of the present invention.

As shown in FIG. 9, the PWM light adjusting circuit 41 comprises a register 42, a signal generating section 43, a logic circuit 44, and an AND circuit 45. The PWM light adjusting circuit 41 generates and outputs a FLPWM signal for controlling the luminance of the frontlight 15. The FLPWM signal is typically set to be about 100 Hz. A driving signal is generated from the FLPWM signal. The driving signal is applied to the frontlight 15 which in turn emits light at a predetermined level.

In the PWM light adjusting circuit 41, the register 42 stores a light adjusting pulse width value BPDF which is designated by an integrated CPU (not shown) to the main control section 17, a light adjusting pulse cycle value BPWF, an inverter stopping flag HSYEN, and an output permitting flag EN.

Figure 10:
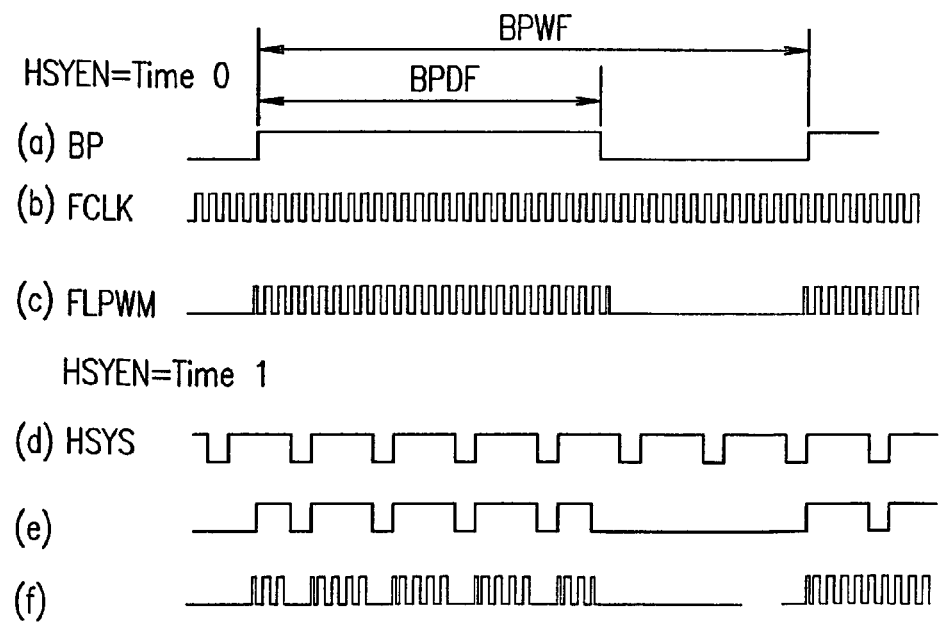
FIG. 10 is a timing chart showing an operation of the PWM light adjusting circuit of FIG. 9.

FIG. 10 is a timing chart showing an operation of the PWM light adjusting circuit 41 of FIG. 9.

The signal generating section 43 receives and counts an inverter original clock signal FCLK in (b) of FIG. 10, sets a time from the starting of the counting to when the count value reaches the light adjusting pulse width value BPDF stored in the register 42 as a time corresponding to the width of a light adjusting pulse BP in (a) of FIG. 10, and during this time, outputs the inverter original clock signal FCLK as the FLPWM signal as shown in (c) of FIG. 10. As shown in (c) of FIG. 10, the output of the inverter original clock signal FCLK is stopped for a time from when the count value reaches the light adjusting pulse width value BPDF to when the count value reaches the light adjusting pulse cycle value BPWF stored in the register 42.

When the inverter stopping flag HSYEN stored in the register 42 is "0", the FLPWM signal in (c) of FIG. 10 is passed as it is through the logic circuit 44. When an output permitting flag EN stored in the register 42 is "1", the FLPWM signal in (c) of FIG. 10 is output through the AND circuit 45.

When the inverter stopping flag HSYEN stored in the register 42 is "1", the FLPWM signal in (c) of FIG. 10 is processed by the logic circuit 44. Specifically, the logic circuit 44 receives the HSYS signal in (d) of FIG. 10 from the timing generating circuit 31, and forbids the output of the FLPWM signal in (c) of FIG. 10 for a time during which the HSYS signal is low, or outputs the FLPWM signal in (c) of FIG. 10 for a time during which the HSYS signal is high. Thereby, the logic circuit 44 outputs the FLPWM signal in (f) of FIG. 10. Further, when the output permitting flag EN stored in the register 42 is "1", the FLPWM signal in (f) of FIG. 10 is output through the AND circuit 45 (see (e) of FIG. 10).

Therefore, when the inverter stopping flag HSYEN stored in the register 42 is "0", the FLPWM signal generated by the signal generating section 43 is output as it is. Thereby, the driving of the frontlight 15 by the inverter light control section 16 is continuously performed so that the frontlight 15 emits light.

When the inverter stopping flag HSYEN stored in the register 42 is "1", the FLPWM signal is output only for a time during which the HSYS signal is high, and the output of the FLPWM signal is stopped for a time during which the HSYS signal is low. Thereby, the driving of the frontlight 15 by the inverter light control section 16 is performed only for the time during which the HSYS signal is high. In other words, the driving of the frontlight 15 by the inverter light control section 16 is performed intermittently. On the other hand, the driving of the frontlight 15 by the inverter light control section 16 is stopped for the time during which the HSYS signal is low. As described above, the time during which the HSYS signal is low is overlapped with the detecting time st during which the voltage signal is captured and transferred from the pressure-sensitive tablet 11 to the AD converter section 12. Therefore, the voltage signal is not affected by the noise of the inverter light control section 16.

Note that the present invention is not limited to the above-described examples and can be modified in various manners. For example, a light and an inverter are illustrated as a noise source, but even for other electronic devices acting as a noise source(s), application of the present invention would detect a voltage signal indicating coordinates without suffering from noise from the electronic device(s). Various types of tablets can be used in the present invention.

According to the coordinate inputting apparatus of the present invention, an operation of a device which generates noise is stopped for at least a time during which the coordinate inputting apparatus is otherwise affected by the noise of the device, which is part of a detecting time during which coordinates are detected. Therefore, the detection of the coordinates is not affected by the noise of the device. A detecting time during which coordinates are detected and a non-detecting time during which detection is not performed are alternately repeated. Since the device is operated within the non-detecting time, the device can be operated for a long time. For example, if the device is an inverter for emitting light, the reduction rate of the average luminance of the device can be minimized.

According to the coordinate inputting apparatus of the present invention, an operation of a device which generates noise is stopped for at least a time during which the coordinate inputting apparatus is otherwise affected by the noise of the device, which is part of a detecting time during which coordinates are detected. Therefore, the detection of coordinate is not affected by the noise of the device. A delay time of rising of the device generated when an operation of the device is resumed is at least partly included within the time during which the coordinate inputting apparatus is otherwise affected by the noise of the device. Therefore, the delay time of rising of the device is not wasted and the actual time during which the operation of the device is stopped is not unreasonably long. Therefore, for example, if the device is an inverter for emitting light, the reduction rate of the average luminance of the device can be minimized.

According to the coordinate inputting apparatus of the present invention, even if the operation of the device is resumed immediately after the stop of the operation of the device, the actual operation of the device is stopped until the time during which the coordinate inputting apparatus is otherwise affected by the noise of the device is ended. Therefore, the time during which the operation of the device is stopped, can be minimized.

The coordinate inputting apparatus of the present invention has a first mode in which a detecting section detects coordinates at a first speed and a second mode in which a detecting section detects coordinates at a second speed greater than the first speed, selectively sets either the first mode or the second mode, and maintains the output of the device in the first mode and the output of the device in the second mode at a predetermined level. Therefore, it is possible to achieve a coordinate inputting apparatus which is consistently optimal irrespective of an input speed. Further, the time during which the operation of the device is stopped can be short in the first mode, thereby making it possible to reduce power consumed by the device.

According to the coordinate inputting apparatus of the present invention, a control section comprises a section for generating a signal. The control section controls the coordinate inputting apparatus so that the signal generating section generates a detecting time signal indicating a time during which the signal generating section detects coordinates and an operation stopping signal for stopping an operation of the device for at least a time during which the coordinate inputting apparatus is otherwise affected by the noise of the device, the time being part of a detecting time during which the coordinates are detected, based on a synchronization signal for synchronizing the device and the coordinate inputting apparatus. Therefore, the detecting time signal and the operation stopping signal can be easily and simultaneously created. Further, the timing between the detecting time signal and the operation stopping signal can be set with great precision, so that the time during which the coordinates are detected and the time during which the operation of the device is stopped can be minimized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A coordinate inputting apparatus capable of being used in combination with a device generating noise, comprising:
an input section for inputting coordinates;
a detecting section for detecting the input coordinates; and
a control section for controlling the entire coordinate inputting apparatus,
wherein the control section sets a detecting time during which the detecting section detects the coordinates and a non-detecting time during which detection is not performed, the detecting time and the non-detecting time being alternately repeated, and
the control section controls the coordinate inputting apparatus so that an operation of the device is stopped for only part of a time during which the coordinate inputting apparatus is otherwise affected by the noise, the time being part of the detecting time.

2. The coordinate inputting apparatus of claim 1, wherein said control section resumes the operation of the device a given time before the end of the detecting time.

3. The coordinate inputting apparatus of claim 2 wherein said given time is equal to a rising time of the device.

4. A coordinate inputting apparatus capable of being used in combination with a device generating noise, comprising:
an input section for inputting coordinates;
a detecting section for detecting the input coordinates; and
a control section for controlling the entire coordinate inputting apparatus,
wherein the control section controls the coordinate inputting apparatus so that an operation of the device is stopped for at least a time during which the coordinate inputting apparatus is otherwise affected by the noise, the time being part of a detecting time during which the coordinates are detected, and
the control section further controls the coordinate inputting apparatus so that when the operation of the device is resumed, at least part of a delay time of rising of the device is included within the time during which the coordinate inputting apparatus is otherwise affected by the noise.

5. A coordinate inputting apparatus according to claim 4, wherein the length of the delay time of the rising is equal to the length of the time during which the coordinate inputting apparatus is otherwise affected by the noise.

6. A coordinate inputting apparatus capable of being used in combination with a device generating noise, comprising:
an input section for inputting coordinates;
a detecting section for detecting the input coordinates; and
a control section for controlling the entire coordinate inputting apparatus,
wherein the detecting section has a first mode in which the coordinates are detected at a first speed and a second mode in which the coordinates are detected at a second speed greater than the first speed,
the control section controls the coordinate inputting apparatus so that the device is stopped for at least a time during which the coordinate inputting apparatus is otherwise affected by the noise, the time being part of a detecting time during which the coordinates are detected, and
an output of the device in the first mode and an output of the device in the second mode are maintained at a predetermined level.

7. A coordinate inputting apparatus capable of being used in combination with a device generating noise, comprising:
an input section for inputting coordinates;
a detecting section for detecting the input coordinates; and
a control section for controlling the entire coordinate inputting apparatus,
wherein the control section comprises a signal generating section, and
the control section controls the coordinate inputting apparatus so that the signal generating section generates a detecting time signal indicating a time during which the signal generating section detects coordinates and an operation stopping signal for stopping an operation of the device for a time during which the coordinate inputting apparatus is otherwise affected by the noise, the time being part of a detecting time during which the coordinates are detected, based on a synchronization signal for synchronizing the device and the coordinate inputting apparatus.

8. A coordinate inputting apparatus adapted to be used in combination with a device generating noise, comprising:
an input section for inputting coordinates;
a detecting section for detecting the input coordinates; and
a control section for controlling the detecting section and a device generating noise;
wherein the control section sets a detecting time during which the detecting section detects the coordinates and a non-detecting time during which detection is not performed, the detecting time and the non-detecting time being alternately repeated, and
the control section stops an operation of the device generating noise for less than the detecting time.

9. A method of controlling a coordinate inputting apparatus and a noise generating device used in combination with the coordinate inputting apparatus comprising the steps of:
providing a detecting section for detecting input coordinates;
providing a control section for controlling the detecting section and the noise generating device;
controlling the detecting section to repeatedly detect coordinates during a detecting period of time and not detect coordinates during a non-detecting period of time; and
stopping an operation of the noise generating device for less than the detecting time.

10. The method of claim 9 including the additional step of resuming the operation of the noise generating device before the end of the detecting time.

11. The method of claim 9 including the additional step of resuming the operation of the noise generating device a given time before the end of the detecting time.

12. The method of claim 11 wherein the given time is equal to a rise time of the noise generating device.

13. The method of claim 9 wherein said step of controlling the detecting section comprises the steps of controlling the detecting section to detect inputs at a first speed in a first mode and at a second speed in a second mode and including the additional step of maintaining an output of the noise generating device at a predetermined level when said detecting device is in said first mode and said second mode.

* * * * *